United States Patent [19]

Cleveland

[11] Patent Number: 4,900,184
[45] Date of Patent: Feb. 13, 1990

[54] STIRRUP CLIP

[76] Inventor: William G. Cleveland, P.O. Box 1671, Vidor, Tex. 77662-1671

[21] Appl. No.: 308,601

[22] Filed: Feb. 10, 1989

[51] Int. Cl.[4] .......................... F16B 2/20; A44B 21/00
[52] U.S. Cl. ..................................... 403/397; 403/289; 403/399; 403/232.1; 24/339; 52/646
[58] Field of Search ............... 403/291, 289, 397, 395, 403/399, 213, 390, 391, 211, 209, 232.1; 52/652, 653, 646; 24/336, 339; 248/68.1, 65

[56] References Cited

U.S. PATENT DOCUMENTS

| 919,100 | 4/1909 | Wedmore | 52/652 |
|---|---|---|---|
| 2,523,785 | 9/1950 | Sereno | 403/397 X |
| 3,360,883 | 1/1968 | Glanzer | 24/339 X |
| 3,636,595 | 1/1972 | Wines | 24/339 X |
| 3,806,994 | 3/1974 | Lankford | 403/397 |
| 4,309,120 | 1/1982 | Werthmann | 24/339 X |
| 4,617,775 | 10/1986 | Padrun | 403/397 X |
| 4,838,726 | 6/1989 | Huerta | 403/397 |

FOREIGN PATENT DOCUMENTS 1275377 8/1968 Fed. Rep. of Germany ........ 24/339

Primary Examiner—Andrew V. Kundrat
Assistant Examiner—Franco S. Deliguori
Attorney, Agent, or Firm—Roy H. Smith, Jr.

[57] ABSTRACT

A resilient clip in three integrally joined sections: a central or web section centered on a z-axis, and two extensions from the web extending along x- and y-axes. Each section or portion may be described as a split sleeve and has a generally cylindrical opening therethrough, respectively centered on the same three axes. These openings are contoured and disposed to snugly receive a reinforcing bar or rod and a pair of corner legs of a generally rectangular stirrup, a piece of heavy wire bent into a rectangular shape and receiving reinforcing bars at its four corners, holding them in such positions to maintain the planned spacing between rebars. Each of the central openings through the three parts is joined to the outside by a lateral slit defined by a pair of lips that are forced apart by pushing the clip onto the steel member. The extensions of the clip may each have a second cylindrical opening which is parallel to the first mentioned and closely adjacent thereto, to accommodate parallel legs of the stirrup when the two ends thereof overlap. The pair of extensions may either face in opposite directions, or they may face in the same direction, whereby both extensions may be simultaneously mounted on the legs of a stirrup corner by a single pushing action. The clip may also be used to secure together any three mutually perpendicular rods or bars.

13 Claims, 2 Drawing Sheets

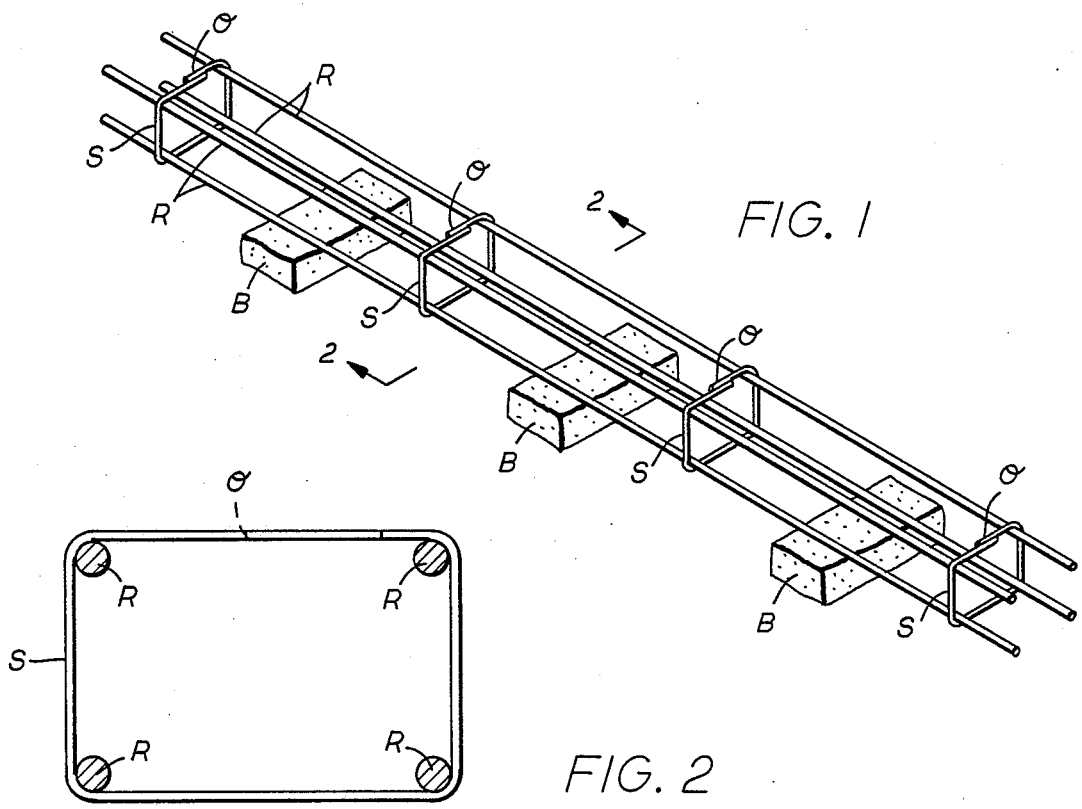
FIG. 1
FIG. 2
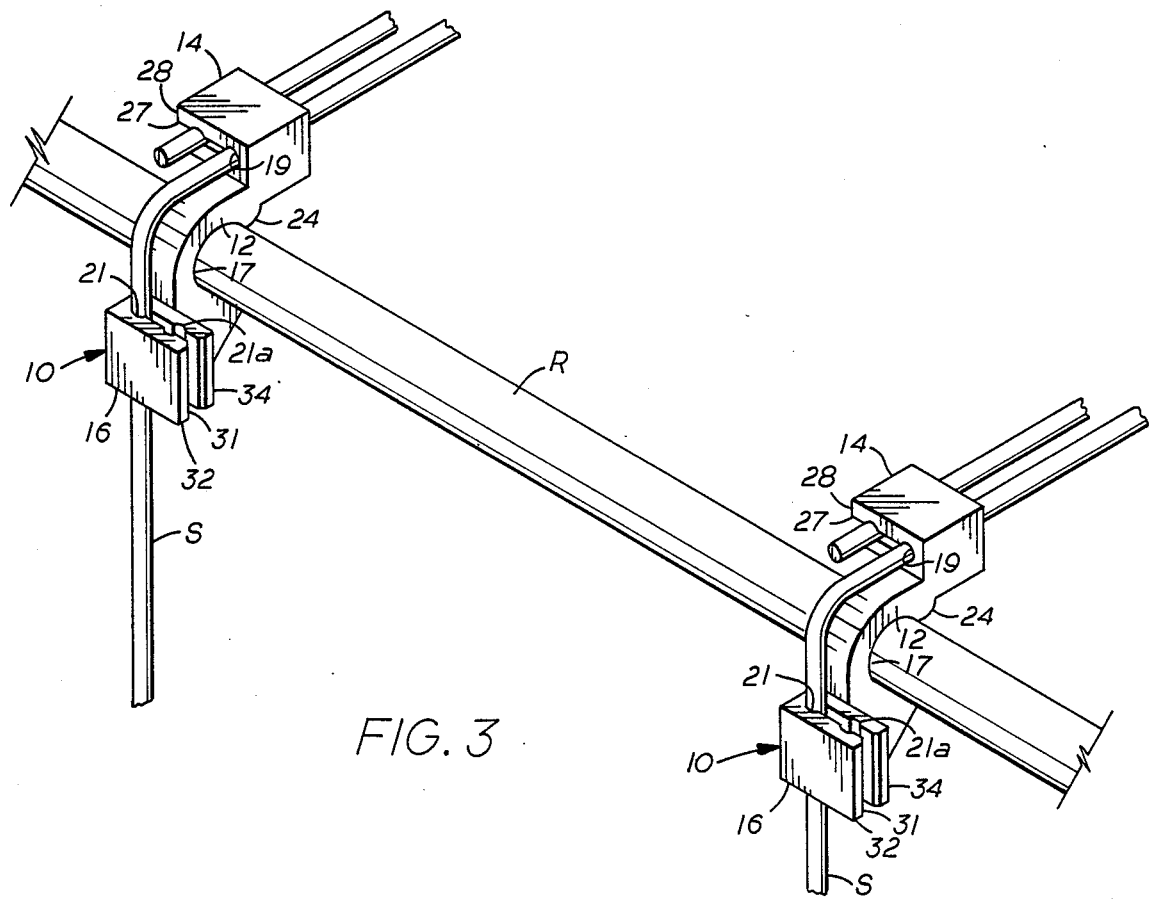
FIG. 3

STIRRUP CLIP

The present invention is concerned with reinforced concrete, and more particularly with concrete foundations, beams, piers, and walls such as chain walls, wherein there may be groups of several reinforcing bars running parallel with each other and requiring support to maintain the planned spacing prior to the actual pouring of the concrete slurry. Yet more particularly, the invention takes the form of a resilient clip adapted to secure together a reinforcing bar or rod and one of the wire stirrups disposed at spaced intervals in the pouring form for the purpose of securing the bars in preplanned positions.

Within the pouring form, the reinforcing bars (hereafter sometimes called "rebars", whether round or square or other cross section), may extend for a considerable length, as much as 30 or even 100 feet, and they are disposed in parallel relationship, spaced from one another by a matter of inches. It is important that this spacing be maintained rigidly, so that the rebars will not become loose and congregate together, leaving an empty area that will be thereby weakened. To maintain the predetermined spacing, it is customary to provide stirrups along the length of the rebars, spaced from one another every three feet or so. A stirrup is nothing more than a heavy iron wire or rod that has been bent into a loop, usually a rectangular loop. In a typical assembly such a rectangular stirrup surrounds four rebars which are secured to the four inside corners of the stirrup, in contact with the pair of legs forming one corner of the stirrup. The standard prior art method of securing the rebar to the stirrup is by wrapping the three members (rebar and two legs of stirrup) with wire.

Wire wrapping is a time consuming process, and one requiring a certain amount of skill to do it properly. An inexperienced worker requires a large amount of supervision, signifying more labor expense. Furthermore, the final product of the new man's work is likely to result in a connection in which the bar and the stirrup may easily be jarred into sliding or other relative movement, upsetting the planned spacing.

Such disadvantages are overcome in the present invention by providing an easily installed clip which snaps onto all three members—the two legs of the stirrup and the rebar. The clip is made of a resilient but rugged material such as a dense polyethylene, and it has three discrete portions which are integrally attached together—a center or web portion for the rebar, a pair of extensions from the web in two different directions. If the web portion is thought of as centered on the z-axis of a three-dimensional Cartesian coordinate system, one of the extensions is centered on the x-axis of the same coordiante system and accommodates one of the legs forming the corner of the stirrup. The other extension is centered on the y-axis of the system and receives the other leg of this corner (assuming that the two legs come together approximately at right angles; if a different angle is formed between them, of course the axes must be rotated accordingly).

Each of the three portions of the clip has a generally cylindrical passage therethrough to snugly receive the rebar or a leg of the stirrup, and these three openings correspond to and are centered on the three coordinate axes. Each cylindrical opening is only approximately complete when considered circumferentialy, as each also has a lateral breach or slit to permit the clip to be pushed onto the member, this breach or slit being defined by a pair of facing lips which are forced apart as the clip is pressed onto the steel member. Each of the three parts of the clip might thus be described generally as having the shape of a split sleeve.

Provision is made for the fact that the heavy wire stirrup, which is typically formed at the construction site by bending the heavy wire into a rectangular shape of the desired dimensions. The heavy wire as thus formed may have overlapping ends rather than nicely butted ends, and thus there may be a spot where two parallel legs must be secured together. Each of the extensions from the stirrup clip of the invention may be made with two parallel openings to receive such parallel leg sections of the stirrup, and, should such a section occur at a spot on the stirrup periphery other than a corner, may be used to secure such an overlap pair together, leaving the other openings empty.

The stirrup clip as thus described is simple to install, and requires none of the training and experience involved in making wire ties. Only a minimum of time is involved, and there is no need for a supervisory inspection of the novice's work on each and every connection. Much labor saving is thus realized, and the cost of the clip is not significantly different from the saving of the cost of wire.

The invention may perhaps be better comprehended by reading the following detailed description of a preferred embodiment in conjunction with the drawing accompanying and forming an integral part of the present invention. In the drawing:

FIG. 1 is a perspective view, in somewhat schematic form, of a typical array of four parallel rebars in a long run, together with a number of wire stirrups spaced along the length of the run to suport the four rebars at the corners of each stirrup, but without any of the clips of the invention.

FIG. 2 is a section through FIG. 1 showing a typical stirrup and the four rebars disposed at its inside corners, again without any of the clips of the invention.

Figure 4:
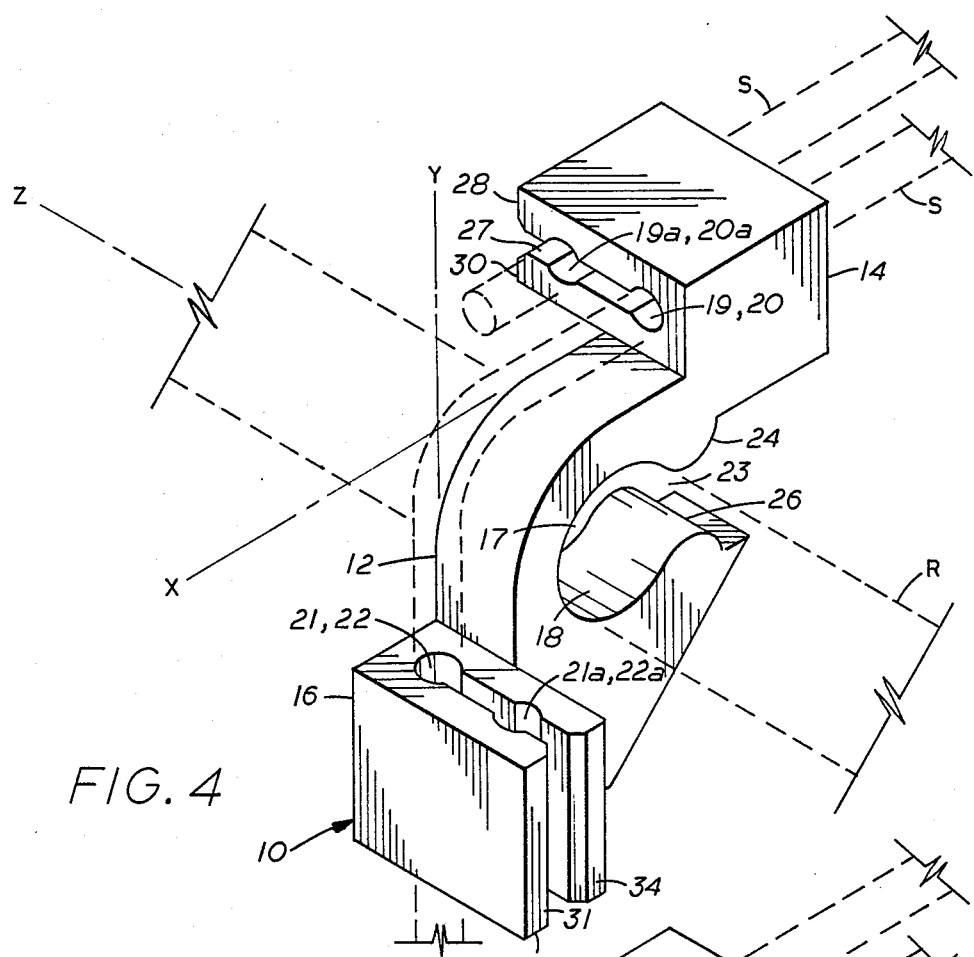

FIG. 3 is a perspective view of two of the stirrup clips of the invention as installed on two neighboring stirrups through whose corners passes the same reinforcing rod, FIG. 4 is a perspective view of one of the stirrup clips of the invention, as installed on one corner of a stirrup in which one leg of the corner consists of two parallel and overlapping ends. In this view the rebar and stirrup legs are shown in phantom in order to better portray the details of the invention.

Figure 5:
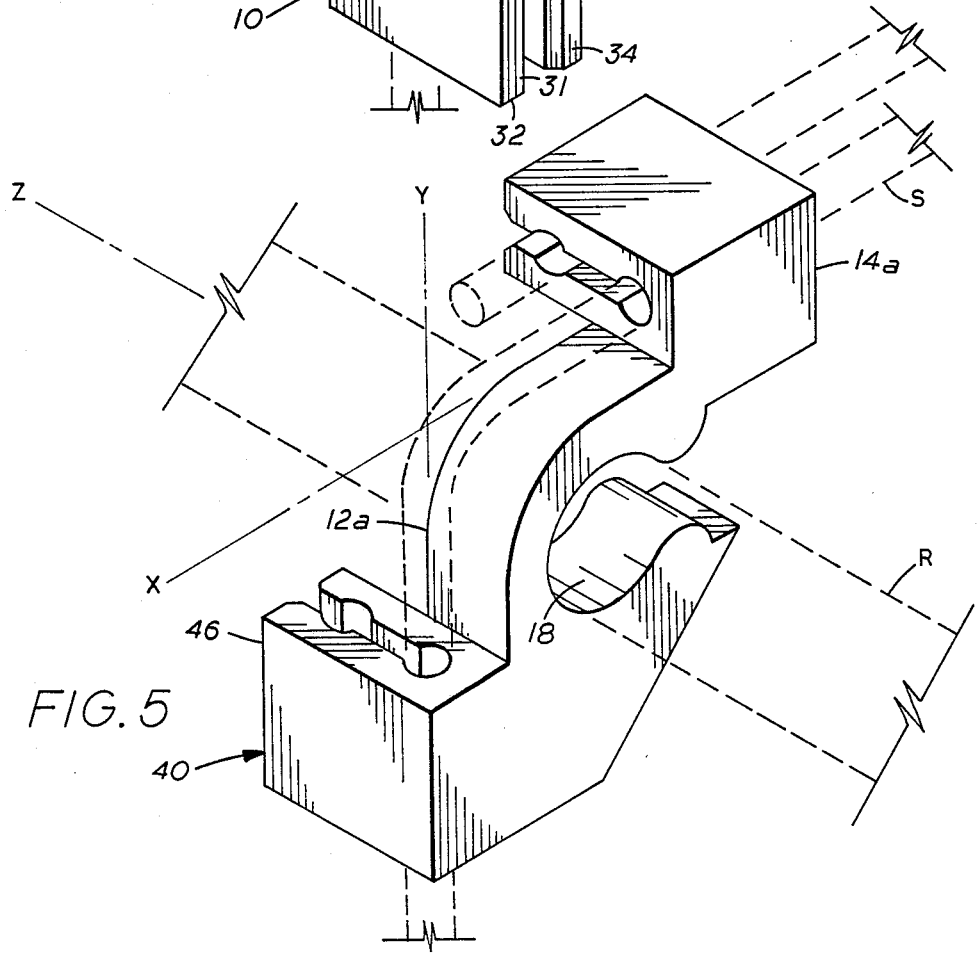

FIG. 5 is a perspective view of a slightly modifed clip of the invention, one in which both extension portions of the clip have their split sleeves opening in the same direction, so that the clip may be pushed onto both legs of a stirrup corner simultaneously. In other respects the clip is like that shown in FIG. 4, and is illustrated in the same manner.

DETAILED DESCRIPTION OF THE INVENTION

FIGS. 1 and 2 illustrate the setting for the invention, a typical run of four reinforcing rods R extending parallel to one another for a considerable length, and spaced fairly close to one another. Such spacing has been carefully calculated by the structural engineer, and it is important that the spacing be maintained as shown, for if the spacing is uncontrolled some portions of the rebar lengths will bunch together and leave other parts relatively barren; if the concrete is poured under such a condition, the areas that are barren of rebars will not have the preplanned strength and may fail prematurely. The four rebars R are supported and held in place by the stirrups S spaced along the length of the run. The members B shown between stirrups are spacers to keep the reinforcing structure off the ground and may be, for instance, ordinary bricks. No connections between the rebars R and stirrups S is shown in these two figures, but the reader can imagine prior are wire ties at each corner, the wire used being a small gauge, ductile wire applied as multiple turns wrapped around the rebar and both legs at each corner of the stirrup, something on the order of the rope lashings around poles used in making a raft. Note that all of the stirrups S are shown with ends overlapping at 0; in FIG. 2 such stirrup legs are shown overlapping at 0 adjacent one corner.

The stirrup clip 10 of the invention is illustrated in FIGS. 3 and 4, the latter figure showing a single clip in full perspective detail while the former shows a pair of clips assembled with a single rebar and a pair of neighboring stirrups. As will be evident to the reader, the clip 10 contains three significant portions, and each portion has a different orientation. Such orientations may be considered as the three mutually perpendicular axes of a three-dimensional Cartesian coordinate system, the familiar z-, x- and y-axes. Thus if the center portion or web 12 is arbitrarily considered as centered on the z axis, one leg 14 of the stirrup will be centered on the x axis while the other leg 16 will be centered on the y axis, as illustrated. This orientation is the result, of course, of the fact that the rebar is usually perpendicular to the plane of each stirrup through which it passes, and the stirrup legs which meet in a corner are normal to one another, if a rectangular shape is employed. When some other geometrical arrangement is used, the parts of the stirrup clip can be adjusted to conform, and in fact the clip as shown is flexible enough to accommodate considerable variation in the size of the angles at the corners of the stirrups.

As shown in FIG. 4, each of the three portions of the stirrup clip has a cylindrical passage therethrough, and it is the orientation of these openings that determines the axis on which each portion is centered. In the web 12 the opening 17 as defined by cylindrical wall 18 has an axis which we have called the z axis, while the two extension portions 14 and 16 have openings 19 and 21 with cylindrical walls 20 and 22 centered respectively as the x and y axes (or axes parallel to them, as we have actually shown axes that do not intersect each other or the illustrated z-axis). In each extension, the second cyylindrical walls and openings are designated 19a–20a and 21a–22a, respectively, and it is to be understood that these are parallel to and side-by-side the corresponding parts of their companion openings.

To mount the clips 10 on the steel members of the reinforcing system, and in a manner which avoids the inherent awkwardness of starting at one end of a member and sliding it along the length of the member, each of the two legs of the stirrup extensions and the web portion of the clip are provided with a lateral slit which joins its central opening to the outside. Thus the cylindrical wall 18 of the web portion which defines the central opening 17 therethrough is breached by the slit 23 defined by the facing lips 24 and 26; when the clip is being mounted by pushing it onto a rebar R, these lips 24 and 26 are spread apart until continued force seats the rebar fully on cylindrical surface 18, where it is snugly received as lips 24 and 26 snap back into the normal position shown in FIG. 4. Likewise, the x-axis opening 19 through extension 14 is provided with slit 27 between lips 28 and 30, while the y-axis opening 21 through extension 16 is provided with slit 31 between lips 32 and 34. The lips of each of the latter are spread apart in the same manner when the clip is forced onto the legs of the stirrup, and each stirrup leg is snugly received in its opening 19 or 21. Each of the three parts of the stirrup clip of the invention are integrally secured to one another, preferably being cast or otherwise fabricated as a single, unitary piece. Each of the three portions may also be described generally as split sleeve, this term implying that the member is hollow and has a wall that is breached to permit it to be forcibly mounted on an external rod by a pushing action.

It will be noted that each of the extensions 14 and 16 of the clip contains a second opening 19a or 21a, parallel to and closely adjacent the above described openings 19 and 21, respectively, somewhat elongating the respective slits 27 and 31. As mentioned above, this feature, which may not always be necessary, is to take care of the situation when the two ends of a stirrup overlap one another, and the overlapped length happens to fall close to the corner where the stirrup clip of the invention is to be mounted.

The careful reader, in examining FIG. 4, will note a peculiarity in connection with mounting the clip on the corner legs of a stirrup. The clip must be pushed onto the stirrup, and the direction of pushing for both legs is along the z axis, but in opposite directions. In other words, the extension 14 must be pushed up and leftwardly in the figure, while the extension 16 must be pushed downwardly and to the right, 180 degrees apart. This is not an essential feature of the invention, and the three portions of the clip can as well be made so that the two extensions are pushed onto the stirrup in the same direction, for instance by rotating the extension 16 180 degrees about its y-axis, so that slit 31 faces upwardly and to the left in the drawing figure. The clip as shown is sufficiently flexible that it can readily be mounted as first described, in connection with FIG. 4, and has the advantage of making a tightly locked connection.

Such a modified stirrup clip 40 is illustrated in FIG. 5, which has a central web portion 12a identical to that of FIG. 4 but has a slightly 10 modified lower extension 46. Upper extension 14a is identical to the same member 14 in FIG. 4, and is disposed in the same manner. Lower extension 46 is identical with the lower extension 16 of the FIG. 4 embodiment except that it has been rotated 180 degrees. It will be evident to the reader that in mounting this clip on the reinforcing members that, after first pushing the clip onto the rebar R (in the foreground portion of the rebar as shown in FIG. 5), the clip 40 may be then slid along the length of the rebar until the legs S of the stirrup are encountered. At such time clip 40 may be pushed onto both legs S at the same time.

With respect to sizes, materials, etc., it is believed that the same is within the knowledge of those of average skill in the art. The "wire" of the stirrups is actually quite heavy, as much as ⅜ths of an inch in diameter, and this wire is prerferably more ductile than the much stiffer rebars, which may be as much as ½ or ⅝ths of an inch in diameter. A typical rectangle size for a stirrup would be 12 inches by 8 inches. As to be clips of the invention, they are actually fairly small, on the order of one inch overall in each of 3 dimensions.

Now that a preferred embodiment has been described, it will be apparent to those of average skill in the art that there are many variations of the invention which do not depart from its central concept. The scope of the invention should not be limited by the foregoing description, but only by the following claims, which should be construed to embrace all substantially equivalent means operating in substantially the same manner to obtain substantially the same results.

What is claimed is:

1. In a concrete reinforcing system, a clip for securing together a reinforcing bar and the pair of legs forming one corner of a wire stirrup, such clip being of resilient material and having a central web portion in the general shape of a split sleeve adapted to receive said reinforcing bar, said web portion having an opening extending therethrough along a first axis defining a first line of action, and two split sleeve extensions integrally secured to the web and extending therefrom with through openings extending along second and third axes defining second and third lines of action which are perpendicular to each other said second and third lines of action being coplanar whereby the legs of the stirrup received therein will also be coplanar, each split sleeve extension being conformed and disposed to encircle and receive one of the legs of the stirrup.

2. The clip of claim 1 in which said split sleeves are sized and shaped so that there is no sliding or other motion of the reinforcing bar relative to the stirrup after the clip is installed.

3. The clip of claim 1 in which at least one of said extensions contains two parallel openings, whereby it encircles and receives a pair of parallel and side-by-side legs of the stirrup.

4. The clip of claim 1 in which both of said split sleeve extensions extend in the same direction parallel to the first line of action of the first axis.

5. The clip of claim 1 in which said split sleeve extensions extend in opposite directions, parallel to the first line of action of the first axis.

6. In a concrete reinforcing system, a clip for securing together a reinforcing bar and the pair of legs typically meeting at the origin of a three dimensional Cartesian coordinate system having x, y, and z axes, such clip being of resilient material and having a central web portion with an opening therethrough adapted to receive the reinforcing bar disposed along the z axis and also having two extensions integrally secured to the web with each extension having an opening therethrough adapted to encircle and receive one of the legs of the stirrup, said openings of the extensions being centered on the x and y axes, respectively, and lying in a common plane generally normal to the z axis, each of the openings of the central web portion and extensions having a lateral passage joining the opening to the exterior of the clip, each such lateral passage being defined by a pair of lips which are spread apart in mounting the clip.

7. The clip of claim 6 in which said split sleeves are sized and shaped so that there is no sliding or other motion of the reinforcing bar relative to the stirrup after the clip is installed.

8. The clip of claim 6 in which at least one of said extensions contains two parallel openings, whereby it encircles and receives a pair of parallel and side-by-side legs of the stirrup.

9. The clip of claim 6 in which both of said lateral passages of the extensions on the x and y axes extend in the same direction, parallel to the z-axis.

10. The clip of claim 6 in which said lateral passages of the extensions on the x and y axes extend in opposite directions, parallel to the z-axis.

11. A clip for securing together three mutually perpendicular rod or bar members, such clip being of resilient material and having a central web portion in the general shape of a split sleeve having an opening therethrough extending along a first axis adapted to receive one of said rods or bars and two split sleeve extensions integrally secured to the web and extending therefrom with openings therethrough extending along second and third axes which are normal to each other and lie in a common plane which is which normal to the first axis along which the opening through the web member extends, each split sleeve extension being conformed and disposed to encircle one of the other two bars or rods.

12. The clip of claim 11 in which said split sleeves are sized and shaped so that there is no sliding or other motion of any one bar or rod relative to the others.

13. The clip of claim 11 in which at least one of said extensions contains two parallel openings, whereby it encircles and receives a pair of parallel and side-by-side rods or bars.